(12) United States Patent
Benchaalal et al.

(10) Patent No.: US 11,263,313 B2
(45) Date of Patent: Mar. 1, 2022

(54) SECURING EXECUTION OF A PROGRAM

(71) Applicant: Rambus Inc., Sunnyvale, CA (US)

(72) Inventors: Othman Benchaalal, Aix en Provence (FR); Vincent Dupaquis, Biver (FR)

(73) Assignee: Rambus Inc., San Jose, CA (US)

(*) Notice: Subject to any disclaimer, the term of this patent is extended or adjusted under 35 U.S.C. 154(b) by 0 days.

(21) Appl. No.: 15/784,010

(22) Filed: Oct. 13, 2017

(65) Prior Publication Data

US 2018/0068116 A1    Mar. 8, 2018

Related U.S. Application Data

(63) Continuation of application No. PCT/FR2016/050782, filed on Apr. 6, 2016.

(30) Foreign Application Priority Data

Apr. 15, 2015   (FR) .................................... 1500794

(51) Int. Cl.
*G06F 21/00*         (2013.01)
*G06F 21/54*         (2013.01)
(Continued)

(52) U.S. Cl.
CPC .............. *G06F 21/54* (2013.01); *G06F 11/28* (2013.01); *H04L 9/004* (2013.01);
(Continued)

(58) Field of Classification Search
CPC .... G06F 21/54; G06F 11/28; G06F 2221/033; H04L 9/004; H04L 2209/38
See application file for complete search history.

(56) References Cited

U.S. PATENT DOCUMENTS 4,251,885 A    2/1981 Dodt et al.
5,974,529 A *  10/1999 Zumkehr .............. G06F 9/3005
                                                        712/239

(Continued)

FOREIGN PATENT DOCUMENTS

FR      2790844 A1     9/2000
WO      03042547 A2    5/2003
WO      2009156689 A2  12/2009

OTHER PUBLICATIONS

English Translation of International Search Report from PCT Application PCT/FR2016/050782, dated Apr. 15, 2017, 3 pages.
(Continued)

*Primary Examiner* — Shewaye Gelagay
*Assistant Examiner* — Michael M Lee
(74) *Attorney, Agent, or Firm* — Lowenstein Sandler LLP

(57) ABSTRACT

In a general aspect, a method can include: executing an operation of a program that loads an arbitrarily chosen value of an initial data item of a series of ordered data; executing a series of calculation operations distributed in the program, that calculate a current data item based on a preceding data item; performing a final calculation operation of the series of operations that calculates a final data item of the data series; and executing an operation of the program that detects a program execution error by comparing the current data item of the data series with an expected value of the current data item or the final data item, the final data item having an expected value that is independent of the number of data items in the data series and is calculated based on the current data item of the data series and a final compensation data item.

29 Claims, 3 Drawing Sheets

(51) Int. Cl.
*G06F 11/28* (2006.01)
*H04L 9/00* (2022.01)
(52) U.S. Cl.
CPC .... *G06F 2221/033* (2013.01); *H04L 2209/12* (2013.01); *H04L 2209/38* (2013.01)

(56) References Cited

U.S. PATENT DOCUMENTS

| | | | | |
|---|---|---|---|---|
| 6,570,988 | B1* | 5/2003 | Venkatesan | H04L 9/0643 380/28 |
| 7,168,065 | B1 | 1/2007 | Naccache et al. | |
| 8,347,392 | B2* | 1/2013 | Chess | G06F 21/54 726/25 |
| 9,092,618 | B2* | 7/2015 | Fischer | G06F 21/52 |
| 9,177,153 | B1* | 11/2015 | Perrig | G06F 21/57 |
| 2005/0033943 | A1 | 2/2005 | Weiss | |
| 2006/0101310 | A1* | 5/2006 | Diamant | G06F 21/12 714/38.14 |
| 2008/0022130 | A1* | 1/2008 | Amschler | G06F 21/629 713/190 |
| 2011/0047200 | A1 | 2/2011 | Reffee | |
| 2011/0088095 | A1* | 4/2011 | Stewart | G06F 21/54 726/25 |
| 2011/0185433 | A1* | 7/2011 | Amarasinghe | G06F 21/53 726/25 |
| 2012/0331307 | A1* | 12/2012 | Fernandez Gutierrez | G06F 21/72 713/190 |
| 2013/0024930 | A1* | 1/2013 | Steil | G06F 21/575 726/16 |
| 2013/0347109 | A1* | 12/2013 | Fluhrer | G06F 21/12 726/23 |
| 2014/0040337 | A1* | 2/2014 | Chenu | G06F 7/582 708/250 |
| 2014/0325238 | A1* | 10/2014 | Ghose | G06F 21/72 713/190 |
| 2016/0055331 | A1* | 2/2016 | Szczeszynski | G06F 21/64 726/22 |

OTHER PUBLICATIONS

CN Office Action dated Mar. 16, 2020 re: CN Appln. No. 201680021925.1. 21 Pages. (W/Translation).
CN Office Action dated Dec. 4, 2020 re: CN Appln. No. 201680021925.1. 15 pages. (W/Translation).
IN First Examination Report dated Mar. 31, 2021 re: IN Appln. No. 201737035051. 6 pages.

\* cited by examiner

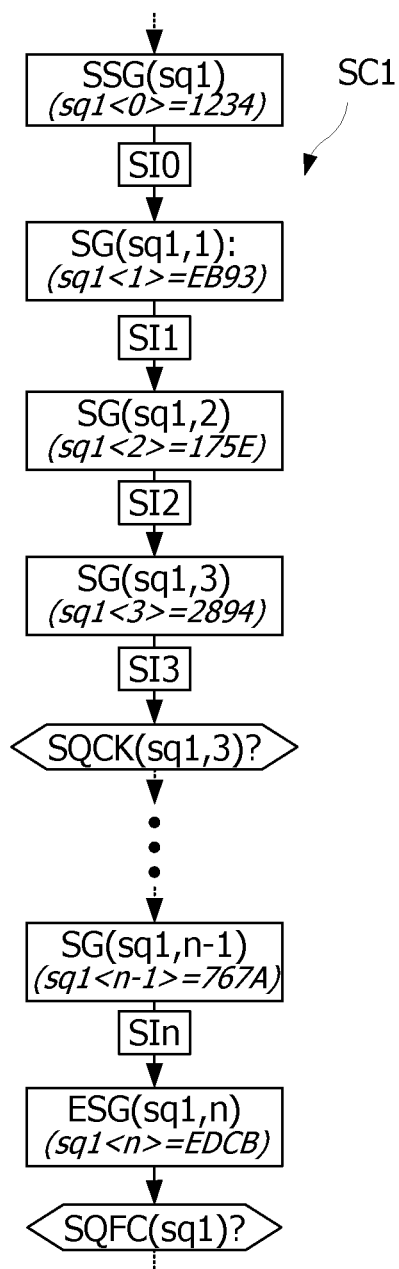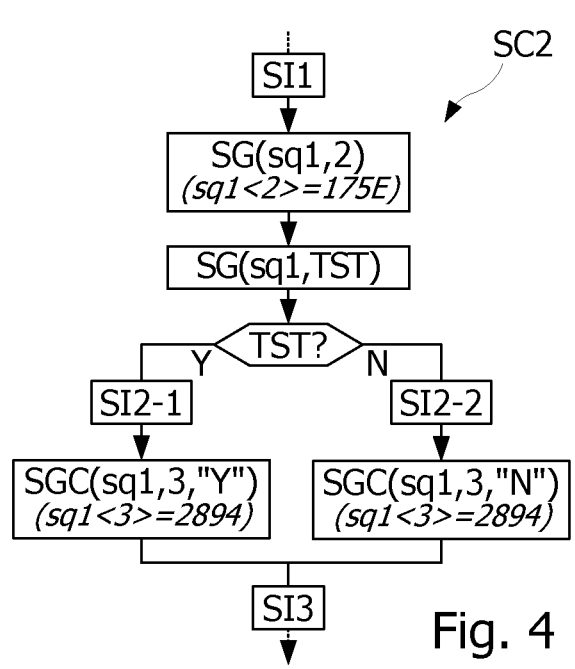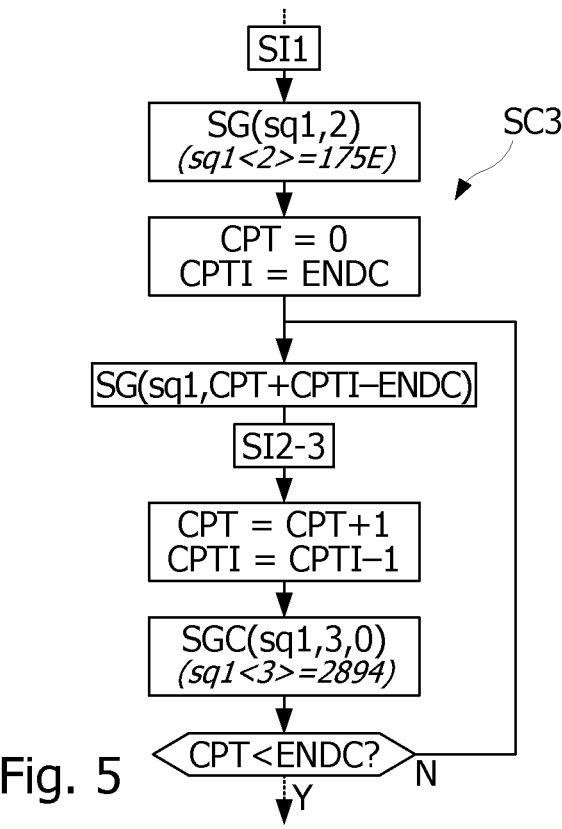
Fig. 3
Fig. 4
Fig. 5

SECURING EXECUTION OF A PROGRAM

CROSS REFERENCE TO RELATED APPLICATIONS

This application is a continuation of, and claims priority to PCT Application No. PCT/FR2016/050782, filed Apr. 6, 2016, which claims the benefit of French Application No. FR1500794, filed Apr. 15, 2015, the disclosures of which are incorporated herein by reference in their entireties.

TECHNICAL FIELD

The present disclosure relates to controlling of execution of a program by a processor, in particular to protect the program against modification or tampering, before or during its execution.

BACKGROUND

Secure integrated circuits, such as smart card ICs, are subject to various attacks by malicious actors who seek to discover their structure and/or secrets, such as secret information, they store or manipulate. These are, for example, cryptographic circuits, or microprocessors programmed to execute cryptographic algorithms.

Some hacking methods involve injecting errors into an integrated circuit to disrupt the execution of so-called sensitive operations, for example authentication operations or operations of a cryptography algorithm.

Such attacks, called fault or error injection attacks, may occur during so-called sensitive calculation phases, for example during calculation phases of an identification code or during the reading of a cryptographic key from a memory. They allow, in combination with mathematical models and using intentionally false results, by way of disturbances applied to the integrated circuit, to determine a secret element such as a secret key or a password, or to deduce the structure of a cryptography algorithm.

In particular, localized attacks can include introducing disturbances (glitches) at a given point of the circuit, for example by means of a laser beam or an X-ray beam. A localized attack may target, for example, the supply voltage, a data or address path, or a clock signal of the integrated circuit.

Thus, an attack can target data read from the program memory and cause a modification of an instruction code being transmitted on a data bus. The modified instruction code can be interpreted as a jump instruction where the read instruction was not a jump instruction, or as another instruction where the read instruction was a jump instruction. Such a modification can also cause a modification of the operand associated with a jump instruction code, e.g., modify the destination address of the jump.

The attack can also target a read address of the program memory, that is, it can cause a jump in the absence of any jump instruction code. If the attack targets the path of the read addresses of the program memory, the jump affects only one address read, since the program counter of the central unit is not modified, unless the read instruction code is a jump.

A jump thus caused may execute a routine that is inaccessible in normal operation, such as a data retrieval routine, or can bypass verification procedures.

Such attacks can also target the read address of a data word and, therefore, modify the value of an operand of an instruction.

It is therefore desirable to detect that execution of a program by a processor has been disrupted. It is also desirable to detect a modification of a program by an unauthorized person. It may also be desirable that such a detection consumes minimal resources from the processor executing the program. It may also be desirable to implement such a detection without increasing the development and modification work of the program by an authorized person.

SUMMARY

Embodiments relate to a method of executing a program by an electronic device, the method including: executing an operation of the program configured to load an arbitrarily chosen value of an initial data item belonging to a series of ordered data, executing a series of calculation operations distributed in the program, including calculation operations each configured to calculate a current data item of the data series based on a preceding data item of the data series, performing a final calculation operation of the series of operations, configured to calculate a final data item of the data series, and executing an operation of the program configured to detect a program execution error by comparing the current data item of the data series with an expected value of the current data item or the final data item, the final data item having an expected value independent of the number of data items in the data series and being calculated by the final operation based on the current data item of the data series and a final compensation data item.

According to an embodiment, an expected value of a data item of the data series is calculated during a pre-processing step for generating the program, by a module for calculating constants, used by the error detection operation and by the final calculation operation of the series of calculation operations.

According to an embodiment, the expected value of the final data item is determined solely from the initial data item.

According to an embodiment, the expected value of the final data item is set equal to the binary ones' complement of the initial data item.

According to an embodiment, one of the calculation operations of the series of calculation operations is configured to determine one of the data items of the data series based on a rank of the data item in the data series.

According to an embodiment, one of the calculation operations of the series of calculation operations is configured to determine a data item of the data series by calculating a signature applied to the preceding data item of the data series.

According to an embodiment, one of the calculation operations is configured to determine a first data item of the data series based on the value of a variable specific to the program and the value of the preceding data item of the data series, and a subsequent calculation operation of the series of calculation operations is configured to determine a second data item of the data series, the second data item having an expected value independent of the program-specific variable.

According to an embodiment, a data item of the data series is obtained by a cyclic redundancy check calculation applied to the preceding data item of the data series.

According to an embodiment, a data item of the data series is obtained by a modular arithmetic calculation applied to the preceding data item of the data series, choosing as a modulus a prime number greater than a maximum value of the data items of the data series.

According to an embodiment, the method includes: allocating distinct data series to a first function of the program and a second function called by the first function, upon returning to the first function following the call and execution of the second function, performing a calculation operation of the series of calculation operations, applied to a data item of the data series of the first function and to the calculated final data item of the data series of the second function to obtain a third data item, and performing another calculation operation of the series of calculation operations, applied to the third data item to obtain a fourth data item having an expected value which is independent of an expected final data item of the series assigned to the second function.

According to an embodiment, the program includes an iterative processing loop implementing a first iteration counter varying in a first direction at each iteration, the method including: managing a second iteration counter varying in a second direction opposite to the first direction, so that the sum of the values of the first counter and the second counter remains constant, and in the iterative processing loop, performing a calculation operation of the series of calculation operations, applied to a calculated data item of the data series, and to a constant based on the sum of the values of the first counter and the second counter, and performing another calculation operation applied to the expected value of the constant to obtain a fifth data item of the data series having an expected value which is independent of the expected value of the sum of the values of the first counter and the second counter.

Embodiments also relate to a method for securing execution of a program, implemented by a processor, the method including: generating a file for declaring values of constants used by the aforementioned execution method, searching in source code or pre-processed code of the program for an instruction involving a comparison of the current data item of the data series with an expected value of the current data item, calculating the expected value of the current data item based on the initial data item of the data series and the rank of the current data item in the data series, and inserting into the constant value declaration file a constant having the calculated expected value.

According to an embodiment, the method includes: searching in the source code of the program for an instruction involving a final calculation operation of the series of calculation operations, calculating the value of a final compensation data item to which the final calculation operation is applied, so that the final calculation operation applied to the final compensation value provides the expected final data item of the data series, and inserting a constant having the value of the final compensation data item into the constant value declaration file.

According to an embodiment, the method includes: searching in the source code of the program for a compensation instruction involving a calculation operation of a data item of the data series applied to a data item not belonging to the data series, calculating the value of a compensation data item to which the calculation operation of the compensation instruction is applied so that this calculation operation produces a data item of the data series which is independent of an expected value of the data item not belonging to the data series, and inserting a constant having the value of the compensation data item into the constant value declaration file.

Embodiments also relate to a computer program product including instructions which, when executed by a processor, implement the foregoing methods.

According to an embodiment, the calculation operations of the series of calculation operations and the error detection operations are in the form of macros.

BRIEF DESCRIPTION OF DRAWINGS

Exemplary embodiments are described in the following, without limitation in connection with the accompanying drawings.

DETAILED DESCRIPTION

Figure 1:
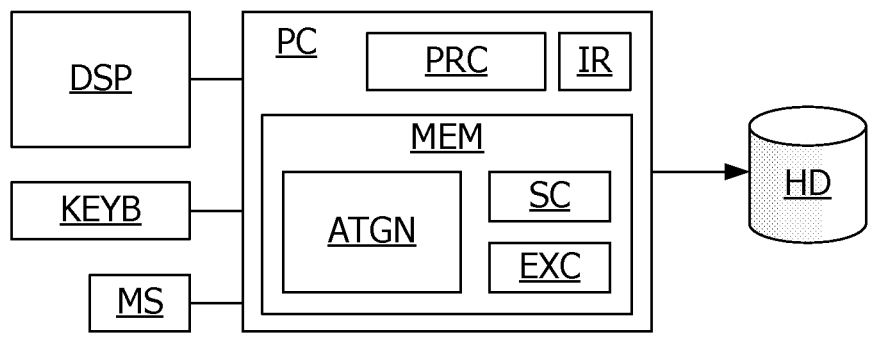
FIG. 1 schematically shows an environment suitable for the implementation of an embodiment.

FIG. 1 shows an electronic device PC adapted to the implementation of a supervision method according to one embodiment. The device PC comprises a memory MEM storing a program, a processor PRC capable of executing the program and other programs for supervising hardware units of the device, such as input/output units including a user control interface. The control interface may thus comprise a display screen DSP, one or more input units such as a mouse MS and a keyboard KEYB, and/or other input/output peripheral devices such as a touch pad and/or network interface circuits IR. The electronic device PC may be a computer or other device such as a smartphone or a digital tablet.

The memory MEM stores an application ATGN configured to automatically generate a protected program EXC from standard source code SC. The source code SC and the generated program EXC can be saved in a non-volatile memory HD such as a hard disk. The program EXC can then be executed by a processor such as the processor PRC.

Figure 2A:
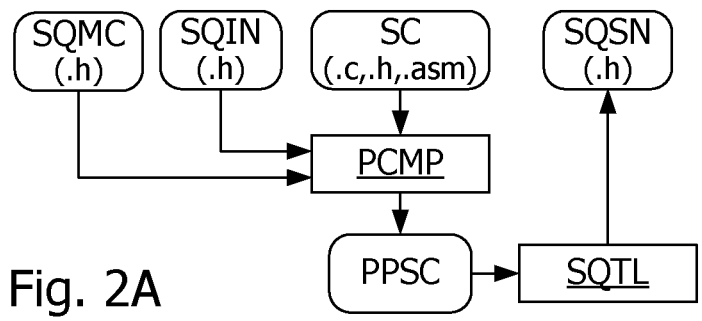
FIGS. 2A, 2B show, in the form of blocks, different modules of an application configured to generate an executable code from a source code, in two phases, according to an embodiment, FIGS. 3 to 7 schematically show different source codes of a program, including instructions for controlling the execution of the program, according to one embodiment.
Figure 2B:
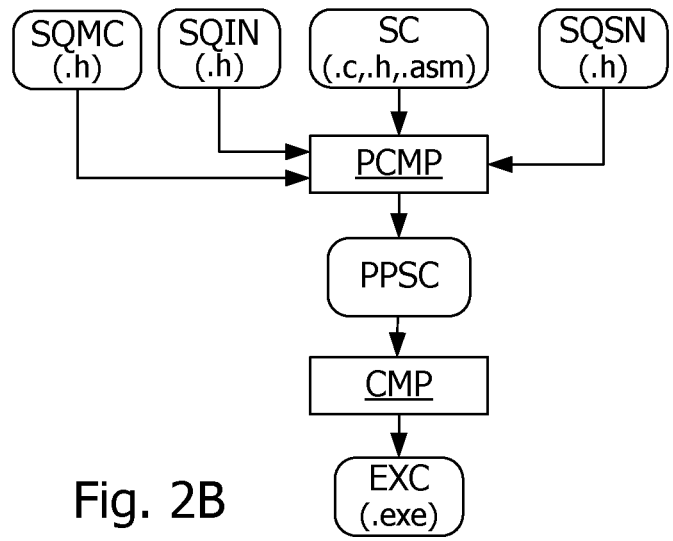

FIGS. 2A, 2B represent different modules of the application ATGN making it possible to generate an executable program EXC from source code SC. The application ATGN includes a pre-compilation module PCMP receiving as an input one or more files containing the source code to be compiled SC and one or more files containing definitions of types and values of constants used in the source code, as well as a supervision constants definition file SQIN, and a macro definition file SQMC. The SQMC and SQIN files are used for implementing a program execution supervision method, according to one embodiment. In FIG. 2A, the pre-compilation module PCMP produces a file PPSC containing pre-compiled source code, in which macros are replaced by instructions specified in the SQMC file, in particular, and wherein the constants are replaced by their respective values defined in the SQIN file. The PPSC file is processed by a constants calculation module SQTL of the application ATGN, which is configured to generate a file SQSN defining constant values used for implementing the program execution supervision method, and in particular constant values used by the macros defined in the SQMC file, which are present in the PPSC file. In FIG. 2B, the pre-compilation module PCMP again produces a PPSC file containing pre-compiled source code, wherein macros are replaced by instructions specified in the SQMC file, and all constants are replaced by their values defined in the SQIN and SQSN files. The PCMP file is provided to a compilation module CMP that generates the executable code EXC corresponding to the source code contained in the PPSC precompiled file.

Of course, the files defining the constraints SQSN, SQIN and the macros SQMC can be grouped into a single file.

FIG. 3 represents source code SC1 of a program. This source code includes several series of instructions SI0, SI1, SI2, SI3, ... SIN executed successively. Each instruction series SI0-SIn can be considered as a program step.

According to one embodiment, the execution of the program generated from the source code SC1 is supervised by means of specific instructions inserted in the source code between the series of instructions SI0-SIn. These specific instructions include in particular an instruction SSG(sq1) for calling an initialization function SSG defining an initial data item sq1<0> of a data series sq1, instructions SG(sq1,i) calling a signature calculation function SG for calculating a data item sq1<i> of the series sq1, corresponding to a step i of the program, and an instruction ESG(sq1,n) for calling a final calculation function ESG for calculating a final data item sq1<n> of the series sq1, corresponding to a final step n of the program. Thus, the instruction SSG(sq1) defines a new data series sq1 by supplying the value of the initial data item sq1<0> of the data series (set to $1234 in the example of FIG. 3, the symbol "$" indicating that the value is expressed in hexadecimal format). The value assigned to the initial data item sq1<0> is chosen independently of the program data. Thus, the value of the data item sq1<0> can be chosen arbitrarily or randomly. The value of the initial data item sq1<0> is for example defined in the SQIN file. The instruction SG(sq1,1) calls the signature calculation function SG, which is applied to the current data item of the series sq1, i.e. sq1<0>, and to the step number 1 to calculate the data item sq1<1> of the series sq1, corresponding to step 1 of the program. In the example of FIG. 3, this instruction assigns to the data item sq1<1> the result of the calculation provided by the function SG, here the value $EB93 in hexadecimal format. The instruction SG(sq1,2) assigns the value $175E calculated from the data item sq1<1> to the data item sq1<2> of the series sq1, corresponding to step 2. The instruction SG(sq1,3) assigns the value $2894 calculated from data item sq1<2> to data item sq1<3> in series sq1 at step 3. The instruction SG(sq1, n-1) assigns the value $767A to the data item sq1<n-1> of the series sq1 at step n-1. Each data item in the series sq1 therefore has a rank in the series corresponding to the step in the program for which it is calculated. Each data item sq1<i> of the series sq1 is thus computed by the function SG based on the previous, or preceding data item sq1<i-1> in the series sq1.

At any time during program execution, the current data item sq1<i> of the series sq1 can be compared to its expected value ($1234, $ EB93, $175E, $2894, ... $EDCB) by an instruction SQCK, SQFC, according to the number i of the current step executed by the program. If this comparison reveals a difference, it means that one of the instructions for calling functions SSG, SG and ESG has not been executed or has been disrupted, or that one of the call parameters of the SSG, SG and ESG functions has been modified, for example upon reading. In the example of FIG. 3, the SQCK instruction is located after the calculation of the data item sq1<3> of the series sq1, and the SQFC instruction, located after the calculation of the final data item sq<n>, compares the calculated value of the final data item with its expected value, i.e. $EDCB. In this way, it is possible to detect whether the execution of the program has been disturbed or if the program has been modified without updating the data series sq1. Any appropriate action can then be taken during the execution of the program to handle this disturbance.

According to one embodiment, the calculation function SG is a signature calculation applied to the current data item sq1<i> of the series sq1 and to the step number i, varying from 1 to n in FIG. 3.

According to an embodiment, the final data item sq1<n> of the series sq1 is the ones' complement of the initial data item sq1<0> (obtained by inverting all the bits of the initial value), i.e. $EDCB for an initial data item sq1<0> equal to $1234. For this purpose, the module SQTL calculates a final compensation data item CF such that the signature calculation function SG applied to the data item sq1<n-1> of the series sq1 at the penultimate step n-1 and to the final compensation data item CF provides the final data item sq1<n>. Thus, the function ESG(sq1, n) can be achieved by applying the function SG to the data item of the series sq1 at step n-1 and to the final compensation data item CF:

$$sq1<n>=ESG(sq1,n)=SG(sq1,CF)=SIG(sq1<n-1>, CF),$$

Where SIG is a signature calculation function applicable to several parameters.

FIG. 4 represents source code SC2 of the program, in a case where the series of instructions SI2 comprises two series of alternate instructions SI2-1 and SI2-2 which are executed based on the result of a test "TST?" of a Boolean variable TST equal to "Y" or "N". The program can be supervised by providing in the source code SC2, before the test instruction TST, an instruction SG(sq1, TST) for calling the signature calculation function SG applied to the current data item sq1<2> of the series sq1 and the variable TST. After each of the alternative series of instructions SI2-1 and SI2-2, the source code SC2 also includes an instruction SGC(sq1,3,"Y"), SGC(sq1,3,"N") for compensating the value of the variable TST introduced into the series sq1 by the instruction SG(sq1, TST), in order to obtain the value of the data item sq1<3> of the series sq1 corresponding to step 3, expected in the absence of instruction SG(sq1,TST), i.e. $2894. Thus, the instruction SGC(sq1,3, CS1) is included in the test branch where the variable A receives the value of the constant CS1, and the instruction SGC(sq1,3, CS2) is included in the test branch where the variable A receives the value of the constant CS2. Thus, if the value of the variable A introduced in the series by the instruction SG(sq1,A) corresponds to the value which is compensated by the instruction SGC(sq1,3, CS1) or SGC(sq1,3, CS2), the value of the data item sq1<3> which is calculated by this last instruction does not depend on the value of the variable A, insofar as it can be calculated only from the initial data item sq1<0> of the series sq1 and the corresponding step number 3.

In this way, it is possible to detect whether the test instruction "TST?" is not executed, if part of one or the other of the series of instructions SI2-1, SI2-2 is not executed, and/or if the value of variable A is forced to a value other than CS1 or CS2, or is modified during the execution of the series of instructions SI2-1 or SI2-2. The values of the constants CS1, CS2 may be defined in the SQIN file.

FIG. 5 represents source code SC3 of the program, in a case where the series of instructions SI2 comprises a loop in which a series of instructions SI2-3 is executed an number of times ENDC. The source code SC3 includes an instruction for initializing a counter CPT and, in the loop, an instruction for incrementing the counter by one and an end-of-loop test instruction comparing the value of the counter CPT with the number of iterations ENDC.

In order to supervise the correct execution of the loop, the source code SC3 includes a statement "CPTI=ENDC" for initializing an inverse counter CPTI that receives the number of iterations ENDC, this initialization statement being placed before entering the loop. In the loop, the source code SC3 includes a statement "CPTI=CPTI−1" for decrementing the inverse counter CPTI and an instruction for invoking the signature calculation function SG applied to the current data item sq1<2> of the series sq1 and to the value "CPT+CPTI−ENDC" which is supposed to be zero. After exiting the loop, the source code SC3 includes a call to the function SGC (sq1,3,0) for compensating the value of the variable "CPT+CPTI−ENDC" supposed to be zero, introduced in the series sq1 by the instruction SG(sq1, CPT+CPTI−ENDC), to obtain the value of the data item sq1<3> of the series sq1 corresponding to the next step, in the absence of the instruction SG(sq1, CPT+CPTI−ENDC), i.e. $2894 in step 3. Thus, the value of the data item sq1<3> does not depend on the values of the counters CPT, CPTI, or the number of iterations ENDC, insofar as it can be calculated only from the initial data item sq1<0> of the series sq1 and the corresponding step number 3. In contrast, if the value of one of the counters CPT, CPTI is modified by an attack, the value introduced in the series sq1 by the instruction SG(sq1, CPT+CPTI−ENDC) is not null and therefore is not compensated by the compensation instruction SGC(sq1,3,0). As a result, the value of the data item sq1<3> is not equal to its expected value ($2894 in the example of FIG. 5).

In this way, it is possible to check whether the values of the counters CPT, CPTI are consistent. It may be noted that it is also possible to supervise that the expected number of iterations has been executed by providing at the end of the loop an instruction SG(sq1, ENDC−CPT) or SG(sq1, CPTI), followed by a compensation instruction SG(sq1, 3, 0) to obtain the value of the data item sq1<3> corresponding to the next step, i.e. $2894 for step 3. It may also be noted that the calculation CPT+CPTI−ENDC in the instruction SG(sq1, CPT+CPTI−ENDC) may be replaced by any other calculation of a variable that is supposed to be invariant, in so far as the value of this variable can be determined in advance, in particular at compile-time of the program. For example, the value of the constant ENDC may be defined in the SQIN file.

Figure 6:
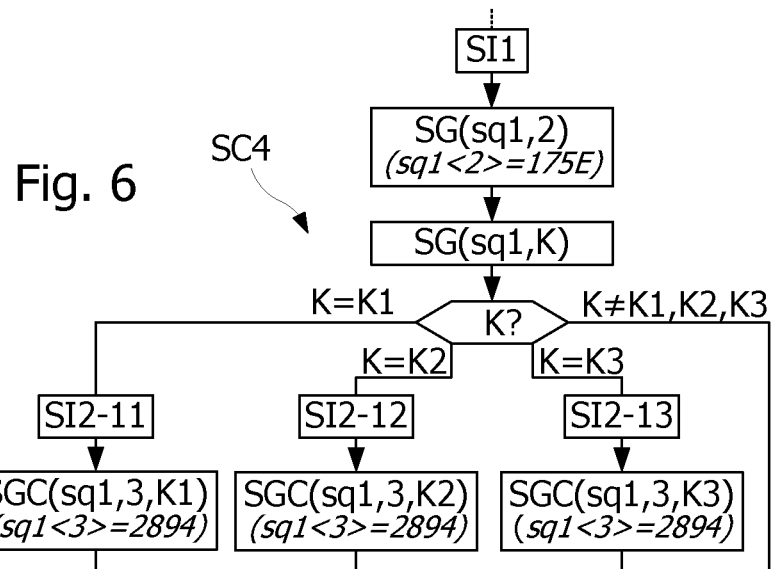

FIG. 6 represents source code SC4 of the program, in the case where the series of instructions SI2 includes multiple (three in the example of FIG. 6) alternative series of instructions SI2-11, SI-12 and SI2-13 which are executed based on the result of a test "K?" on the value of a variable K that can take one of several values in a set of predefined constants K1, K2, K3. The numeric or alphanumeric values of the constants K1, K2, K3 can be defined in the SQIN file. The execution of the program may be supervised by providing an instruction SG(sq1, K) for calling the signature calculation function SG applied to the current data item sq1<2> of the series sq1 and to the value of the variable K, before the test "K?" on the value of the variable K, and a compensation instruction SGC(sq1,3, K1), SGC(sq1,3, K2), SGC(sq1,3, K3) provided in each alternative instruction branch. The instructions SGC(sq1,3, K1), SGC(sq1,3, K2), SGC(sq1,3, K3) compensate the value of the variable K introduced in the series sq1 by the instruction SG(sq1, K) to produce the value ($2894) of the data item sq1<3> of the series sq1, corresponding to the next step (3), in the absence of the instruction SG(sq1, K). If the execution of the program is disturbed, so that the series of executed instructions SI2-11, SI2-12, SI2-13 is not the one corresponding to the value of the variable K, which was introduced in the series sq1 by the instruction SG(sq1, K), the compensation instruction SGC (sq1,3, K1), SGC(sq1,3, K2), SGC(sq1,3, K3) executed next cannot produce the expected value of the data item sq1<3> corresponding to step 3. If none of the instruction series SI2-11, SI2-12, SI2-13 is executed, none of the compensation instructions SGC(sq1,3, K1), SGC(sq1,3, K2), SGC (sq1, 3, K3) is executed and therefore the program cannot be in a condition for achieving the expected value of the data item sq<3> corresponding to step 3 ($2894 in the example of FIG. 6). It may be noted that the case where the variable K is different from the constants K1, K2 and K3 can be handled as a non-erroneous case of the program, by providing, in the branch of the program corresponding to this case, a signature calculation operation to achieve the expected value of the data series sq1 for step 3. In addition, instructions may be provided in the program to ensure that this branch is executed only if the value of K is different from the constants K1, K2 and K3 (for example instructions for testing and reading this data).

In this way, it is possible to detect if the test "K?" relating to the variable K is not executed or if the value of the variable K is forced to a value other than K1, K2, K3, or if the executed series of instructions SI2-11, SI2-12 or SI2-13 does not correspond to the value of the variable K. In the example of FIG. 6, the branch corresponding to the case where the variable K is not equal to one of the values K1, K2, K3 does not include a compensation instruction SGC (sq1,3, Ki), with Ki=K1, K2 or K3. It follows that an error will be detected if the variable K determined before the test K? is equal to a value different from K1, K2 and K3. The values of the constants K1, K2, K3 may be defined in the SQIN file.

Figure 7:
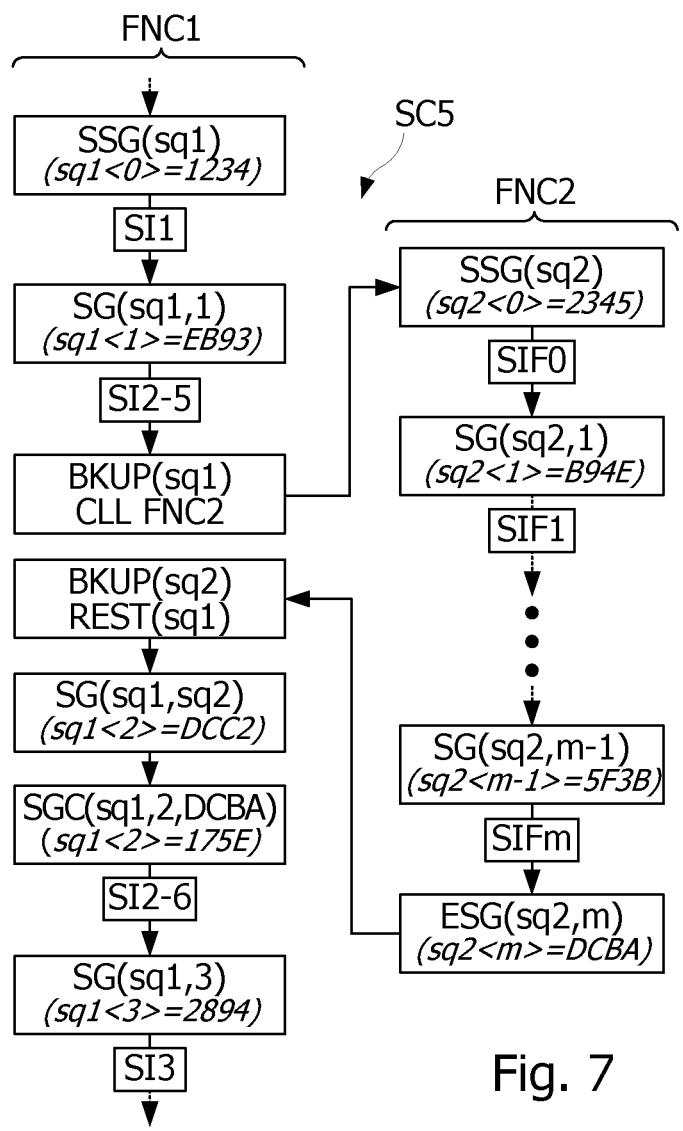

FIG. 7 represents source code SC5 of the program, in the case where the series of instructions SI2 belongs to a calling program or a function FNC1 and includes an instruction "CLL FNC2" for calling a subroutine or a function FNC2. Hereinafter, the term function more generally refers to a routine or a procedure. In the example of FIG. 7, the series of instructions SI2 includes a series of instructions SI2-5 before the instruction "CLL FNC2" and a series of instructions SI2-6 after this instruction. Furthermore, the function FNC2 includes m series of instructions SIF0, SIF1, . . . SIFm. As before, execution of the FNC2 function can be supervised by inserting instructions for invoking the SSG, SG and ESG functions. The SSG function initializes another series of data sq2 (sq2<0>=$2345 in the example of FIG. 7). The initial value sq2<0> of the sq2 series can be defined in the SQIN file. The instructions calling the function SG successively calculate the data items sq2<1> to sq2<m−1> of the series sq2 based on a step number from 1 to m−1, and the instruction calling the ESG function calculates the final data item sq2<m> of the series sq2, equal to the binary ones' complement of the initial data item sq2<0> (=$2345) of the series sq2, that is to say $DCBA.

In order to supervise the execution of the program, the call instruction "CLL FNC2" is preceded by a backup instruction of the current data item (sq1<2>) of the series sq1 of the calling program. The return to the program or to the calling function FNC1, following execution of the called function FNC2, is followed by the following instructions:

an instruction BKUP for backing up the final data item sq2<m> of the series sq2 of the called function FNC2, an instruction REST for restoring the saved data item sq1<2> of the series sq1 of the calling function FNC1, an instruction SG(sq1, sq2) for calling the signature calculation function SG applied to the current (restored) data item sq1<2> of the series sq1, and to the current data item sq2<m> of the series sq2 of the called function FNC2, namely $EDCB, and a compensation instruction SG(sq1, 2, sq2<m>), or SG(sq1, 2, $EDCB), to compensate for the final data item sq2<m> of the series sq2 introduced in the series sq1, to obtain the data item sq1<2> of the series sq1 corresponding to the current step, here $175E for step 2.

In this manner, if the call instruction of the called function FNC2 is not executed or if the execution of the function FNC2 is disturbed, so that the value of the current data item of the series sq2 upon return to the calling function FNC1 is different from the value of the final data item sq2<m>, the values of the next data items sq1<2>, sq1<3>, . . . of the series sq1 of the calling function FNC1 will differ from the expected values.

The SSG, SG, ESG, SGC functions may be macros defined in the SQMC file. The SSG function for initializing a series of data sq may be performed simply by loading into a register or a variable SQRG the initial data item sq<0> of a series of data sq, wherein the value of the data item sq<0> can be defined in the SQIN file in the form of a constant value declaration and passed as a call parameter of the SSG function.

The function SG(sq, X) can be performed by applying the signature calculation SIG to the current data item of the series sq contained in the register SQRG and to the value of the variable X. For this purpose, the value of the data item sq<s> of the series sq and the variable X may for example be represented as hexadecimal numbers having a fixed number of digits (for example 4 or 8), which are concatenated before applying the signature calculation:

$$SG(sq,X)=SIG(SQRG,X).$$

Similarly, the calculation of the next data item sq<s+1> (for the next step s+1) of the series sq can be calculated using the signature calculation function SIG, as follows:

$$sq<s+1>=SG(sq,s+1)=SIG(sq<s>,(s+1)).$$

The function ESG(sq, n) can be reduced to the signature calculation function SG(sq, CF) applied to the current data item sq<n−1> of the series sq stored in the register SQRG and to a constant CF computed by the module SQTL so that the result provided by the function SG(sq, CF) is equal to the binary ones' complement ~(sq<0>) of the initial data item sq<0> of the series sq:

$$ESG(sq,n)=SG(sq,CF)=SIG(SQRG,CF)=\sim(sq<0>).$$

The name of the constant CF that is specified in the instructions corresponding to the macro ESG(sq, n) and in the SQSN file can contain the initial value sq<0> of the series sq.

The function SGC(sq, s, X) can be reduced to the signature calculation function SG(sq, CP) applied to the current data item of the series sq, and to a compensation constant CP computed by the SQTL module so that the result provided by the function SG(sq, CP) is equal to the value of the data item sq<s> of the series sq corresponding to the step s:

$$SGC(sq,s,X)=SG(sq,CP)=SIG(SQRG,CP)=sq<s>,$$

if the current data item sq<s> has the expected value.

The name of the constant CP that is specified in the macro can be defined from the value of the initial data item sq<0> of the series sq, the step number s and the value of the constant X.

The backup and restore functions BKUP, REST can also be defined as macros in the SQMC file. The backup macro BKUP can be replaced by an instruction for storing in a variable SQSV of the value contained in the register SQRG. To allow backup of several data items of distinct series sq, for example in the case of embedded subroutine calls, the variable SQSV may be a table or a stack. The restoration macro REST may be replaced by an instruction for loading into the register SQRG of the variable SQSV or the last data item of a series saved in this variable.

It is also possible to provide a macro SQCK(sq, s) for comparing the current data item sq<s> of the series sq assigned to the function being executed. The macro SQCK (sq, s) can be inserted anywhere in the program, and as many times as necessary, or appropriate. This macro compares the current data item sq<s> of the series sq in the register SQRG with a constant equal to an expected value calculated by the module SQTL based on the initial data item sq<0> of the series sq and the number s of the current step. The value of this constant is calculated and inserted by the SQTL module into the SQSN file, where it is associated with a name that is used in the instructions corresponding to the macro and can be defined from the value of the initial data item sq<0> of the series sq and the number s of the current step.

In the case where the serial data item to be tested is a final value of the series, the SQTL module calculates the expected value by determining the binary ones' complement of the value of the initial data item sq<0> of the series sq defined in the file SQIN.

After a first writing or a modification of the source code SC, the EXC program is generated in two steps. During a first step illustrated in FIG. 2A, the pre-compilation module PPSC is executed on the source code SC, while the values of the constants possibly defined in the SQSN file are ignored. The pre-compilation module PPSC then generates a precompiled source code PPSC in which the macros defined in the SQMC file are replaced by the corresponding instructions, but some of which have as operands names of constants whose values are calculated by the SQTL module. The values of the constants calculated by the SQTL module are entered in the SQSN file. The names of these constants defined in the SQSN file are chosen so that they can be identified without any doubt by the SQTL module (and therefore be chosen according to the language of the source code SC or evolutions it might undergo). All the parameters for calculating the value of each of these constants can be contained in the name of this constant, so that it can be stored in the SQSN file and be taken into account by future compilation tasks, without further intervention by the programmer.

In a second step illustrated in FIG. 2B, the pre-compilation module PPSC is executed on the source code SC, while the values of the constants defined in the SQSN file are taken into account. The pre-compilation module PPSC then generates precompiled PPSC source code in which the macros defined in the SQMC file are replaced by the corresponding instructions and the constant names defined in the SQSN file are replaced by their respective values such as defined in this file. The precompiled source code PPSC thus generated can then be processed by the compiler CMP.

The SQTL module is configured to search the precompiled PPSC source code, among the instructions resulting from the pre-compilation, for the instructions corresponding to a compensation macro SGC, the instructions corresponding to a macro ESG for calculating the final data item of a series of data, and the instructions corresponding to a macro SQCK, SQFC for checking the value of a data item of a data series. For each compensation instruction SGC(sq, s, X) in the source file SC, the SQTL module calculates the value of the data item sq<s−1> of the data series sq in step s−1, through an iterative calculation from the initial data item sq<0> of the series sq, then calculates the data item sqx of the series sq after introducing in the series sq the value X (sqx=SG(sq<s−1>)), then searches for the compensation value CP such that:

$$SG(sqx,CP)=SIG(sqx,CP)=SG(sq<s-1>,s)=sq<s>.$$

For this purpose, if the function SG is invertible in SG−1, then (sqx, CP)=SG−1(sq<s>). If the function SG is chosen such that SG(sqx, CP)=SIG(sqx, CP), the SIG function is invertible in SIG−1, then (sqx, CP)=SG−1(sq<s>).

If the SG function is not invertible, all possible values for CP can be tested until the equality SG(sqx, CP)=sq<s> is verified. The value CP can be associated in the SQSN file with a constant name containing the initial value sq<0> of the series sq, the number of the step s and the value of the data to be compensated X.

For each instruction ESG(sq, s) for calculating the final data item of a series sq in step n, the SQTL module calculates the value sq<n>' of the final data item of the series sq in step n by an iterative calculation from the initial data item sq<0> of the series sq, using at each iteration the equation sq<s+1>=SG(sq<s>, s+1), then searches for a final constant value CF such that the signature SG(sq<n>', CF) is equal to the binary ones' complement ~(sq<0>) of the initial data item sq<0> of the series sq, read from the SQIN file. For this purpose, if the function SG is not invertible, all the possible values of the constant CF can be tested until the equality SG(sq<n>', CF)=~(sq<0>) is verified. The value of the constant CF can be associated in the SQSN file with a constant name containing the initial value of the series sq<0> and the number of the final step n.

For each instruction SQCK(sq, s) for testing a current data item of a data series sq corresponding to a step s, the SQTL module calculates the value sq<s> of the series number sq at step s through an iterative calculation from the initial value sq<0> of the series number sq, then generates a constant in the SQSN file having the value of the series sq at step s. The name of this constant can contain the initial value sq<0> of the series and the number of step s.

The signature calculation function SIG may be a Cyclic Redundancy Check (CRC) calculation function, such as a 16-bit or 32-bit CRC calculation, or other calculations of this type.

According to another embodiment, the signature calculation function SIG can implement a modular arithmetic calculation involving numbers belonging to a Galois field of type GF(p), or involving polynomials belonging to a Galois field of type GF(2n), such that a modular multiplication modulo a prime number p in the case of GF(p), or an irreducible polynomial of degree n in the case of GF(2n). For example, if the data values of the series of data sq are encoded on 16 bits, the modulus chosen for the modular arithmetic calculation may for example be chosen equal to 65537 in decimal. Such a modular arithmetic calculation has the advantage of being invertible. In this case, the signature calculation function SIG can be a modular multiplication in the chosen Galois field GF(p). The compensation function SGC can then be implemented by searching for the multiplicative inverse of the value to be compensated CP, CF. The value $00 can be used as an error value.

It will be apparent that the embodiments described herein are susceptible to various alternatives and applications. In particular, such approaches can be applied to any program whether written in a compiled language or in an interpreted language. In the case of an interpreted language, the processing shown in FIG. 2 does not include a compilation CMP. The pre-compilation task PCMP can also be removed or replaced by a pre-processing for replacing the macros contained in the source code SC with instructions written in the interpreted language. The SQTL module is then configured to determine the values of the constants used in the macros or in the instructions replacing the macros after the pre-processing.

Moreover, the final data item sq<n> of a series sq may not be equal to the binary ones' complement of the initial data item sq<0> of the series sq. It is sufficient that this final data item can be determined from the initial data item sq<0> of the series sq. The final data item sq<n> can also be determined in other ways. For example, if the value sq<0> is represented by the name of a constant, this name can be transformed to provide the name representing the final data item sq<n>. The initial and final data items sq<0> and sq<n> can thus be chosen independently and arbitrarily, where the names designating them are constrained by a rule. Indeed, it is desirable to allow the programmer to add signature calculation steps or instructions in a function of the program without having to update calculations or values of data series items in the routines that call this function and more generally in all the routines of the program whose execution implies the execution of the function.

It is also important that the final data item sq<n> can result from the signature calculation sq<n>=SG(sq, CF), and hence that the compensation data CF can be determined.

Of course, if steps are added to a program function, the pre-compilation PCMP and constant calculation SQTL modules are re-run to update the constants used in the macros defined in the SQMC file.

It may also be preferable for each data series allocated to a function of the program for supervising execution of the function to be unique and therefore that all the functions of the program to be supervised have initial and final data items that are distinct among the functions of the program. Thus, the final data item of a series of data can be calculated for example by an arithmetic or binary operation (for example bit-shifting to the right or the left) applied to the initial data item. This operation may involve a data item specific to the program or to the function of the program to which the data series is assigned. The final data item of a series of data can also be chosen randomly, for example by the module SQTL and associated with the initial data item by the definition of a constant in the SQSN file. The link between the final data item defined by this constant and the data series can be established by the name assigned by the module SQTL to this constant, which contains the value of the initial data item of the data series.

What is claimed is:

1. A method of executing a program by an electronic device comprising a processor and a memory, the method comprising executing the program by the processor, the program comprising a series of instructions and specific instructions for a program error operation, the execution by the processor of the program comprising:
   executing a first instruction of the specific instructions, the first instruction being configured to load a randomly chosen value of an initial data item of a series of ordered data items;
   executing a subset of the specific instructions that is inserted between the series of instructions, wherein each instruction of the subset of the specific instructions is configured to calculate a current data item of the series of ordered data items using an immediately preceding data item of the series of ordered data items, wherein the calculation of the current data item of the series of ordered data items is based at least in part on the randomly chosen value of the initial data item of the series of ordered data items;

executing a final instruction of the specific instructions, wherein the final instruction is configured to calculate a final data item of the series of ordered data items using a penultimate data item of the series of ordered data items and a final compensation data item, wherein the final data item corresponds to an expected value independent from a number of data items in the series of ordered data items; and executing an error detection instruction of the specific instructions, wherein the error detection instruction is configured to detect a program execution error by comparing the current data item of the series of ordered data items with an expected value of the current data item.

2. The method of claim 1, wherein the expected value of the current data item of the series of ordered data items is:
calculated, by a module for calculating constants, during a pre-processing step for generating the program, and
used by the error detection instruction and by the final instruction.

3. The method of claim 1, wherein the expected value of the final data item is determined from the initial data item.

4. The method of claim 1, wherein the expected value of the final data item is set equal to a binary ones' complement of the initial data item.

5. The method of claim 1, wherein at least one instruction of the specific instructions is configured to determine a respective data item of the series of ordered data items based on a rank of the respective data item with respect to the series of ordered data items.

6. The method of claim 1, wherein at least one instruction of the specific instructions is configured to determine the current data item of the series of ordered data items by calculating a signature of the immediately preceding data item of the series of ordered data items.

7. The method of claim 1, wherein at least one instruction of the specific instructions is configured to determine a first data item of the series of ordered data items using a variable specific to the program and the immediately preceding data item of the series of ordered data items, and wherein a subsequent instruction of the specific instructions is configured to determine a second data item of the series of ordered data items, the second data item having an expected value independent from the variable specific to the program.

8. The method of claim 1, wherein a data item of the series of ordered data items is obtained by a cyclic redundancy check calculation applied to the immediately preceding data item of the series of ordered data items.

9. The method of claim 1, wherein a data item of the series of ordered data items is obtained by a modular arithmetic calculation applied to the immediately preceding data item of the series of ordered data items using, as a modulus, a prime number greater than a maximum value of the data items of the series of ordered data items.

10. The method of claim 1, further comprising:
allocating respective distinct series of ordered data items to a first function of the program and a second function of the program called by the first function;
upon returning to the first function following a call to the second function and execution of the second function, executing an instruction of the specific instructions that is applied to a data item of the respective distinct series of ordered data items corresponding to the first function and to a calculated final data item of the respective distinct series of ordered data items corresponding to the second function to obtain a third data item; and
executing another instruction of the specific instructions that is applied to the third data item to obtain a fourth data item having an expected value which is independent from an expected final data item of the respective distinct series of ordered data items corresponding to the second function.

11. The method of claim 1, wherein the program includes an iterative processing loop implementing a first iteration counter varying in a first direction at each iteration, the execution of the program by the processor further comprising:
managing a second iteration counter varying in a second direction opposite to the first direction, such that a sum of a value of the first iteration counter and a value of the second iteration counter remains unchanged; and
in the iterative processing loop, executing an instruction of the specific instructions that is applied to a calculated data item of the series of ordered data items, and to a constant based on the sum of the value of the first iteration counter and the value of the second iteration counter, and executing another instruction of the specific instructions applied to an expected value of the constant to obtain a fifth data item of the series of ordered data items having an expected value which is independent from the expected value of the sum of the value of the first iteration counter and the value of the second iteration counter.

12. The method of claim 1, further comprising generating an executable version of the program from a source code or pre-processed code of the program, the generating comprising:
generating a constant value file specifying values of constants used by the method;
searching in the source code or pre-processed code of the program for an instruction involving a comparison of the current data item of the series of ordered data items with the expected value of the current data item;
calculating the expected value of the current data item based on the initial data item of the series of ordered data items and a rank of the current data item in the series of ordered data items; and
inserting, into the constant value file, a constant having the calculated expected value of the current data item.

13. The method of claim 12, wherein generating the executable version of the program from the source code or the pre-processed code of the program, further comprises:
searching, in the source code of the program, for the final instruction of the specific instructions;
calculating the final compensation data item to which the final instruction is applied, such that the final instruction applied to the final compensation data item provides the expected value of the final data item of the series of ordered data items; and
inserting a constant having a value of the final compensation data item into the constant value file.

14. The method of claim 12, wherein generating the executable version of the program from the source code or the pre-processed code of the program, further comprises:
searching, in the source code of the program, for a compensation instruction calculating a first data item of the series of ordered data items applied to a second data item not belonging to the series of ordered data items;

calculating a value of a compensation data item to which the compensation instruction is applied, such that the calculating the value of the compensation data item produces a data item of the series of ordered data items which is independent from an expected value of the second data item; and inserting a constant having the value of the compensation data item into the constant value file.

15. A non-transitory computer-readable medium comprising a program stored thereon, the program comprising a series of instructions and specific instructions for a program error operation, responsive to execution by a processor the program performs operations comprising:

executing a first instruction of the specific instructions, the first instruction being configured to load a randomly chosen value of an initial data item of a series of ordered data items;

executing a subset of the specific instructions that is inserted between the series of instructions, wherein each instruction of the subset of the specific instructions is configured to calculate a current data item of the series of ordered data item using an immediately preceding data item of the series of ordered data items, wherein the calculation of the current data item of the series of ordered data items is based at least in part on the randomly chosen value of the initial data item of the series of ordered data items;

executing a final instruction of the specific instructions, wherein the final instruction is configured to calculate a final data item of the series of ordered data items using a penultimate data item of the series of ordered data items and a final compensation data item, wherein the final data item corresponds to an expected value independent from a number of data items in the series of ordered data items; and executing an error detection instruction of the specific instructions, wherein the error detection instruction is configured to detect a program execution error by comparing the current data item of the series of ordered data items with an expected value of the current data item.

16. The non-transitory computer-readable medium of claim 15, wherein the specific instructions are included in one or more macros.

17. The non-transitory computer-readable medium of claim 15, wherein the expected value of the current data item of the series of ordered data items is:

calculated, by a module for calculating constants, during a pre-processing step for generating the program, and used by the error detection instruction and by the final instruction.

18. The non-transitory computer-readable medium of claim 15, wherein the expected value of the final data item is determined from the initial data item.

19. The non-transitory computer-readable medium of claim 15, wherein the expected value of the final data item is set equal to a binary ones' complement of the initial data item.

20. The non-transitory computer-readable medium of claim 15, wherein one specific instruction of the specific instructions is configured to determine one of the data items of the series of ordered data items based on a rank of the one of the data items in the series of ordered data items.

21. The non-transitory computer-readable medium of claim 15, wherein at least one instruction of the specific instructions is configured to determine the current data item of the series of ordered data items by calculating a signature of the immediately preceding data item of the series of ordered data items.

22. The non-transitory computer-readable medium of claim 15, wherein at least one instruction of the specific instructions is configured to determine a first data item of the series of ordered data items using a variable specific to the program and the immediately preceding data item of the series of ordered data items, and wherein a subsequent instruction of the specific instructions is configured to determine a second data item of the series of ordered data items, the second data item having an expected value independent from the variable specific to the program.

23. The non-transitory computer-readable medium of claim 15, wherein a data item of the series of ordered data items is obtained by a cyclic redundancy check calculation applied to the immediately preceding data item of the series of ordered data items.

24. The non-transitory computer-readable medium of claim 15, wherein a data item of the series of ordered data items is obtained by a modular arithmetic calculation applied to the immediately preceding data item of the series of ordered data items using, as a modulus, a prime number greater than a maximum value of the data items of the series of ordered data items.

25. The non-transitory computer-readable medium of claim 15, the operations further comprising:

allocating respective distinct series of ordered data items to a first function of the program and a second function of the program called by the first function;

upon returning to the first function following a call to the second function and execution of the second function, executing an instruction of the specific instructions that is applied to a data item of the respective distinct series of ordered data items of the first function and to a calculated final data item of the respective distinct series of ordered data items of the second function to obtain a third data item; and executing another instruction of the specific instructions that is applied to the third data item to obtain a fourth data item having an expected value which is independent from an expected final data item of the respective distinct series of ordered data items of the second function.

26. The non-transitory computer-readable medium of claim 15, wherein the program includes an iterative processing loop implementing a first iteration counter varying in a first direction at each iteration, the operations further comprising:

managing a second iteration counter varying in a second direction opposite to the first direction, such that a sum of a value of the first iteration counter and a value of the second iteration counter remains unchanged; and in the iterative processing loop, executing an instruction of the specific instructions that is applied to a calculated data item of the series of ordered data items, and to a constant based on the sum of the value of the first iteration counter and the value of the second iteration counter, and executing another instruction of the specific instructions applied to an expected value of the constant to obtain a fifth data item of the series of ordered data items having an expected value which is independent from the expected value of the sum of the value of the first iteration counter and the value of the second iteration counter.

27. The non-transitory computer-readable medium of claim 15, the operations further comprising generating an executable version of the program from a source code or pre-processed code of the program, the generating comprising:
- generating a constant value file specifying values of constants used by the program;
- searching in the source code or pre-processed code of the program for an instruction involving a comparison of the current data item of the series of ordered data items with the expected value of the current data item;
- calculating the expected value of the current data item based on the initial data item of the series of ordered data items and a rank of the current data item in the series of ordered data items; and
- inserting, into the constant value file, a constant having the calculated expected value of the current data item.

28. The non-transitory computer-readable medium of claim 27, wherein generating the executable version of the program from the source code or the pre-processed code of the program, further comprises:
- searching, in the source code of the program, for the final instruction of the specific instructions;
- calculating the final compensation data item to which the final instruction is applied, such that the final instruction applied to the final compensation data item provides an expected final data item of the series of ordered data items; and
- inserting a constant having a value of the final compensation data item into the constant value file.

29. The non-transitory computer-readable medium of claim 27, wherein generating the executable version of the program from the source code or the pre-processed code of the program, further comprises:
- searching, in the source code of the program, fora compensation instruction calculating a first data item of the series of ordered data items applied to a second data item not belonging to the series of ordered data items;
- calculating a value of a compensation data item to which the compensation instruction is applied, such that the calculating the value of the compensation data item produces a data item of the series of ordered data items which is independent from an expected value of the second data item; and
- inserting a constant having the value of the compensation data item into the constant value file.

* * * * *